(12) United States Patent
Hiura

(10) Patent No.: US 6,447,197 B1
(45) Date of Patent: Sep. 10, 2002

(54) MOUNTING STRUCTURE FOR FITTING A LOCKING COLLAR TO CABLE REEL ROTOR

(75) Inventor: Yasuhiro Hiura, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 0 days.

(21) Appl. No.: 09/608,607

(22) Filed: Jun. 30, 2000

(30) Foreign Application Priority Data

Jul. 1, 1999 (JP) .......................................... 11-187500

(51) Int. Cl.$^7$ ................................................. F16B 9/02
(52) U.S. Cl. ......................................... 403/14; 403/348
(58) Field of Search .................................. 403/348, 349, 403/350, 13, 14, 374.1, 375, 24; 200/61.54

(56) References Cited

U.S. PATENT DOCUMENTS

| | | | | |
|---|---|---|---|---|
| 4,538,967 A | * | 9/1985 | Furukawa | 403/349 X |
| 4,756,638 A | * | 7/1988 | Neyret | 403/349 X |
| 4,888,456 A | * | 12/1989 | Suzuki | 200/61.27 |
| 5,144,860 A | | 9/1992 | Furuhashi et al. | |
| 5,672,855 A | * | 9/1997 | Uchiyama et al. | 200/61.3 |
| 5,733,134 A | | 3/1998 | Iizuka et al. | |
| 5,773,776 A | | 6/1998 | Uleski et al. | |
| 5,872,343 A | * | 2/1999 | Yokoyama | 200/61.54 |
| 5,884,936 A | * | 3/1999 | Matsu et al. | 280/728.2 |
| 6,260,431 B1 | * | 7/2001 | Yokoyama | 74/469 |

FOREIGN PATENT DOCUMENTS

EP 0771693 5/1997
EP 0926009 6/1999

\* cited by examiner

Primary Examiner—Harry C. Kim
(74) Attorney, Agent, or Firm—Greenblum & Bernstein, P.L.C.

(57) ABSTRACT

In an automobile steering device, a mounting structure is provided for attaching a locking collar having a cancel cam to the hub of a cable reel rotor. The cancel cam is used to automatically deactivate a turn signal switch while it is blinking. The cable reel provides a housing for cable. The cable reel includes a casing attached to a rotor having an inner hub. In an annular hollow area between the casing and the rotor, a flat cable is spirally housed, and the flat cable is wound or rewound in the hollow area in accordance with reciprocal rotation of the rotor which corresponds to steering wheel movement. During the assembly process (i.e. attachment of locking collar to the rotor), it is important that the cancel cam is aligned, or clocked, to a specific radial position with respect to the rotor. There is provided a mounting structure which positively prevents erroneous connections between the locking collar and rotor. More specifically, a plurality of pairs of securing protrusions and inverted L-shaped securing recesses are provided at a certain distance in a peripheral direction on an external peripheral surface of a cylindrically shaped axial hub on the rotor and near a cylindrical inner sleeve of the locking collar. One pair, among the plurality of pairs of securing members, is made a different size from the other pairs. Therefore, when the rotor and locking collar are being assembled together, a failure proof measure is automatically provided to prevent an erroneous connection (i.e. a connection where the locking cam is not properly aligned in the desired normal position). This features reduces erroneous assembly attempts and increases productivity.

23 Claims, 4 Drawing Sheets

Fig. 3 (A)
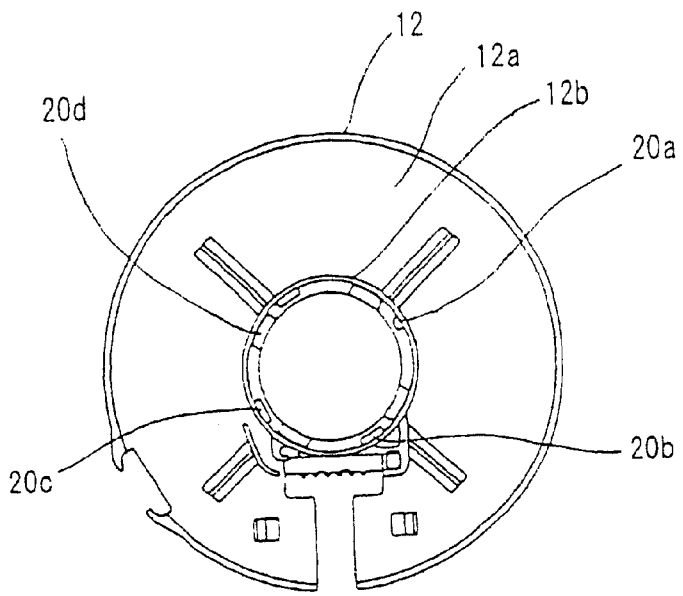
Fig. 3 (B)
Fig. 3 (C)
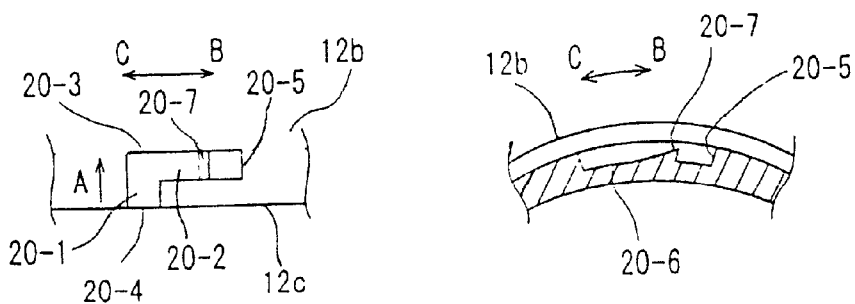
Fig. 4 (A)
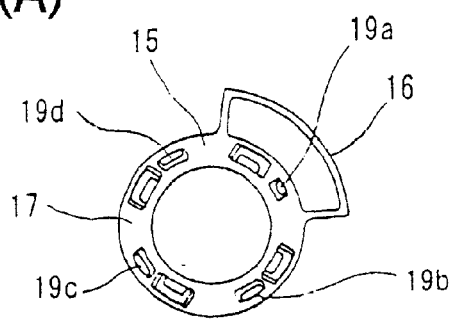
Fig. 4 (B)
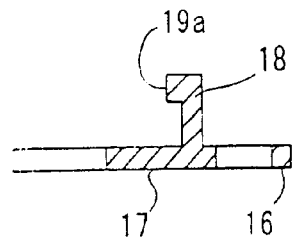

Fig. 6 (A) (Prior Art)
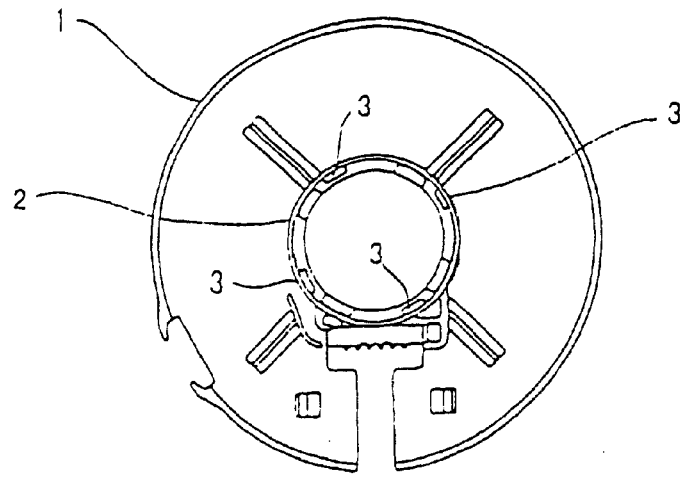
Fig. 6 (B) (Prior Art)
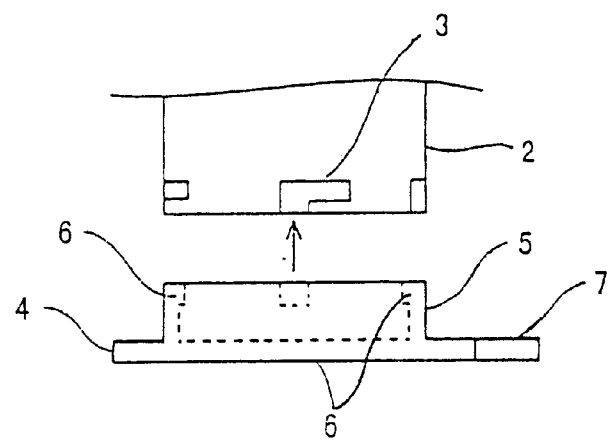
Fig. 6 (C) (Prior Art)
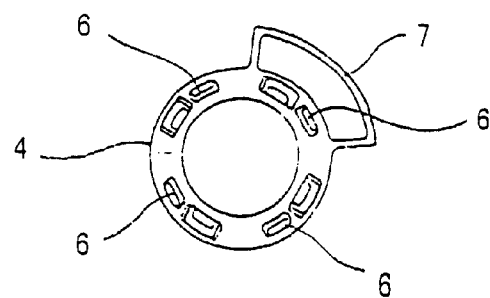

MOUNTING STRUCTURE FOR FITTING A LOCKING COLLAR TO CABLE REEL ROTOR

BACKGROUND OF THE INVENTION

1. Field of the Invention

The present invention relates to a structure for mounting a locking collar having a turn-signal cancel cam onto the rotor of a cable reel which is secured to a steering device of an automobile. In particular, the present invention relates to providing an interfitted locking structure which assures the rotor and locking collar are efficiently assembled together in proper radial alignment without error.

2. Description of Background Information

In an automobile steering system, a cable reel is provided for housing electrical cable. In particular, the cable reel includes a casing attached to a rotor having an inner cylindrical hub. An external cylindrical area of the casing is fixed to a steering shaft. As a result, since the casing and rotor are assembled together, both parts rotate in unison as an assembly. In an annular hollow area between the casing and the rotor, a flat electrical cable is spirally housed, is wound or rewound in the hollow area in accordance with reciprocal rotation of the rotor which corresponds to steering wheel movement.

A conventional steering system including a cable reel rotor 1 and locking collar 4 are illustrated in FIGS. 6(A)–6(C). As part of an automatic canceling operation of a turn signal switch, locking collar 4 is provided with a cancel cam 7, and the locking collar 4 is mounted on rotor 1. A plurality of equally sized L-shaped securing grooves 3 are provided at equally spaced intervals of 90° the outer perimeter of central axial hub 2. In a similar fashion, a plurality of equally sized securing protrusions 6 are provided at equally spaced intervals of 90° on the inside perimeter of cylindrical sleeve 5 of the locking collar 4. The securing grooves 3 can be interlocked with any of the securing protrusions 6, and by doing so, rotor 1 and locking collar 4 may be connected together by inserting the securing protrusions 6 into the securing grooves 3, followed by rotation to engage final fitment. This configuration allows rotor 1 to be connected to locking collar 4 at various radial positions. However, because the securing grooves 3 and securing protrusions 6 are of equal size, the grooves and protrusions can be interlocked in any of the four positions. Thus, a problem may arise during the assembly process when cancel cam 7 is not aligned properly (i.e. clocked) with respect to a desired normal position.

If such an erroneous connection is made, not only is assembly time consumed to unlock the fitted connection, but also there is a higher probability of damaging the connection area of the locking collar and rotor. Therefore, extra care must be taken to avoid causing an erroneous connection. When such an error occurs, assembly time increases and productivity decreases.

SUMMARY OF THE INVENTION

The present invention was made in view of the aforementioned problem. An object of the present invention is to prevent an erroneous connection from occurring without lowering productivity when mounting the locking collar onto the cable reel rotor.

In order to solve the above problems, in a first aspect of the present invention a mounting structure is provided for fitting a locking collar to a cable reel rotor. The mounting structure includes, in a structure for mounting a locking collar equipped with a cancel cam to a cable reel rotor for mounting to a steering device of an automobile, a plurality of pairs of securing protrusions and inverted L-shaped securing recesses. The securing protrusions and recesses are arranged at predetermined distances in a peripheral direction on a peripheral surface of a cylindrically shaped central axial area of the rotor and on a cylindrical inner peripheral surface of the locking collar. The locking collar is configured to be mounted on the rotor following relative rotation after insertion of the collar from the lower side of the rotor, whereby, one pair among the plurality of pairs of securing protrusions and securing recesses are formed as a specific "positioning" (or clocking) securing protrusion and a specific "positioning" securing recess having sizes configured to be different from the sizes of other pairs, thereby causing connection at a normal position of the rotor and the locking collar and by preventing other securing protrusions from insertion into the "positioning" securing recess.

For example, by configuring one pair to be smaller in size than the remaining plurality of securing recesses and securing protrusions, the smaller securing protrusions only are only allowed to be inserted into the corresponding smaller recesses. Therefore, it is impossible to connect the rotor to the locking collar at a position other than the desired normal position. The result is a system that positively prevents an erroneous connection from occurring. Also, the desired normal position for mounting the locking collar to the rotor can readily be identified, thereby making the mounting operation easier, which in turn, improves assembly line productivity.

In another embodiment, the "positioning" securing protrusion and the "positioning" securing recess may be made a larger size than the remaining plurality of securing protrusions and securing recesses. In this case, it is impossible for the "positioning" (or clocking) protrusion to be interlocked with any of the securing recesses other than the "positioning" secured recess having a larger size, which means that any connection at a position other than the desired normal position becomes impossible, thereby preventing an erroneous connection from occurring.

An additional benefit from the mounting system are closer connection tolerances between the locking collar and rotor, thereby, leading to an increased resistance to vibrational and shock forces in an axial direction that are likely to develop during vehicle operation.

In another aspect of the present invention, a mounting system for fitting a locking collar to a cable reel rotor is provided. The locking collar has an annular flange with an upper and lower side, an axially centered cylindrical rim connected to the upper side of the flange, and the cable reel rotor having an axial centered cylindrical hub with a distal end to which the locking collar is attached. The mounting system includes a plurality of securing recesses positioned on one of the outer perimeter of the distal end of the hub and on the inner perimeter of the cylindrical rim, one of the plurality of securing recesses having a different size than the remaining plurality of securing recesses. A plurality of securing protrusions are provided on the other of the inner perimeter of the cylindrical rim and the outer perimeter distal end of the hub, one of the plurality of securing protrusions having a different size than the remaining plurality of securing protrusions, wherein the plurality of securing recesses and protrusions are configured to interlock, thereby fixing the collar to rotor. Additionally, the different sized securing recess and securing protrusion are configured to interlock only with each other respectively, and when interlocked, simultaneously provide a failure proof radial alignment of the cancel cam to a desired normal position, and allowing the remainder of the plurality of securing recesses and protrusions to be interlocked together, thereby fixing the collar to rotor and positively eliminating an erroneous cancel cam alignment.

In other aspects of the present invention, the one of the plurality of securing recesses and one of the plurality of securing protrusions are smaller than the remaining plurality of securing recesses and securing protrusions. Alternatively, the one of the plurality of securing recesses and one of the plurality of securing protrusions are larger than the remaining plurality of securing recesses and securing protrusions.

In further aspects of the present invention, the plurality of securing recesses are provided on the outer perimeter of the distal end of the hub, and the plurality of securing protrusions are provided on the inner perimeter the cylindrical rim. Also, the plurality of recesses may each include an inverted L-shaped recess with a short leg of the L-shape oriented in an axial direction of the hub, and a long leg of the L-shape oriented in a radial direction of the hub, so that the securing protrusions are axially inserted into the short leg of L-shaped recess, after which the locking collar and the hub are relatively rotated to position the securing protrusions in the long leg of the L-shaped recess to prevent disengagement of the locking collar in an axial direction. Moreover, the long leg of at least one L-shaped recess may include a hooking projection to engage a respective one of the securing protrusions to prevent disengagement of the locking collar in a radial direction. Furthermore, an inner axially centered cylindrical sleeve may be provided on the upper side of the annular flange and positioned proximate an inner side of the cylindrical rim, so that the distal end of the hub is engaged between the cylindrical rim and the cylindrical sleeve.

According to other aspects of the present invention, the plurality of securing recesses may be provided on the inner perimeter of the cylindrical rim, and the plurality of securing protrusions are provided on the outer perimeter of the distal end of the hub. Also, the plurality of recesses may each include an inverted L-shaped recess with a short leg of the L-shape oriented in an axial direction of the hub, and a long leg of the L-shape oriented in a radial direction of the hub, so that the securing protrusions are axially inserted into the short leg of L-shaped recess, after which the locking collar and the hub are relatively rotated to position the securing protrusions in the long leg of the L-shaped recess to prevent disengagement of the locking collar in an axial direction. Furthermore, the long leg of at least one L-shaped recess may include a hooking projection to engage a respective one of the securing protrusions to prevent disengagement of the locking collar in a radial direction.

In another aspect of the present invention, an inner axially centered cylindrical sleeve may be provided on the upper side of the annular flange and positioned proximate an inner side of the cylindrical rim, so that the distal end of the hub is engaged between the cylindrical rim and the cylindrical sleeve.

In a further aspect of the present invention, an apparatus for a steering system of a vehicle is provided. The apparatus includes a rotor having an annular-shaped wall connected to a central axial hub, the hub having a distal connecting end opposite the wall, a locking collar having an annular flange with an upper and lower side and a cancel cam formed on the outer perimeter of the flange, wherein the flange is connected to an axially centered cylindrical rim. A mounting system for fitting the cylindrical rim to the distal connecting end of the hub is provided, and the mounting system includes a plurality of securing recesses positioned on the other of the outer perimeter of the distal connecting end of the hub and on the inner perimeter the cylindrical rim, one of the plurality of securing recesses having a different size than the remaining plurality of securing recesses. A plurality of securing protrusions are provided on one of the inner perimeter of the cylindrical rim and the outer perimeter of the hub, one of the plurality of securing protrusions having a different size than the remaining plurality of securing protrusions, wherein the plurality of securing recesses and protrusions are configured to interlock, thereby fixing the collar to rotor. Furthermore, the different sized securing recess and securing protrusion are configured to interlock only with each other respectively, and when interlocked, simultaneously provide a failure proof radial alignment of the cancel cam to a desired normal position, and allowing the remainder of the plurality of securing recesses and protrusions to be interlocked together, thereby fixing the collar to rotor, and positively eliminating an erroneous cancel cam alignment. Moreover, the apparatus for a steering system may further include any of the various aspects related to the above described mounting systems.

BRIEF DESCRIPTION OF THE DRAWINGS

FIG. 3(A) is a bottom plan view of the rotor, FIG. 3(B) is an enlarged side view of the mounting structure, and FIG. 3(C) is an enlarged cross-sectional view of the mounting structure.

FIG. 4(A) is a plan view of the lower side of the locking collar, and FIG. 4(B) is an enlarged cross-sectional view of the mounting structure of a second embodiment of the present invention.

FIGS. 6(A)–(C) depicts a conventional example in which FIG. 6(A) is a bottom plan view of the rotor, FIG. 6(B) is a side view of the mounting structure of the rotor and a locking collar, and FIG. 6(C) is a plan view of the lower side of the locking collar.

DETAILED DESCRIPTION OF THE INVENTION

Figure 1:
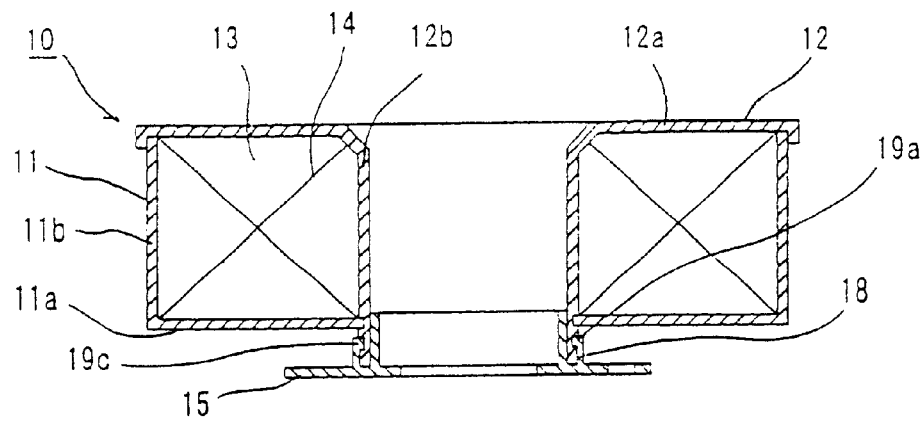
FIG. 1(A) is a cross-sectional view of a locking collar mounted onto a cable reel rotor.
FIG. 1(B) is an enlarged cross-sectional view of the mounting structure, according to a first embodiment of the present invention.
Figure 1:
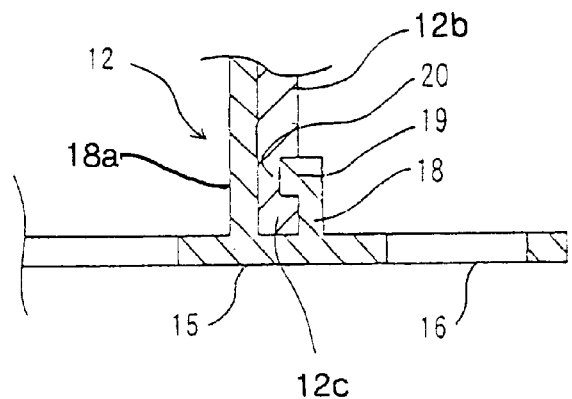
Figure 2:
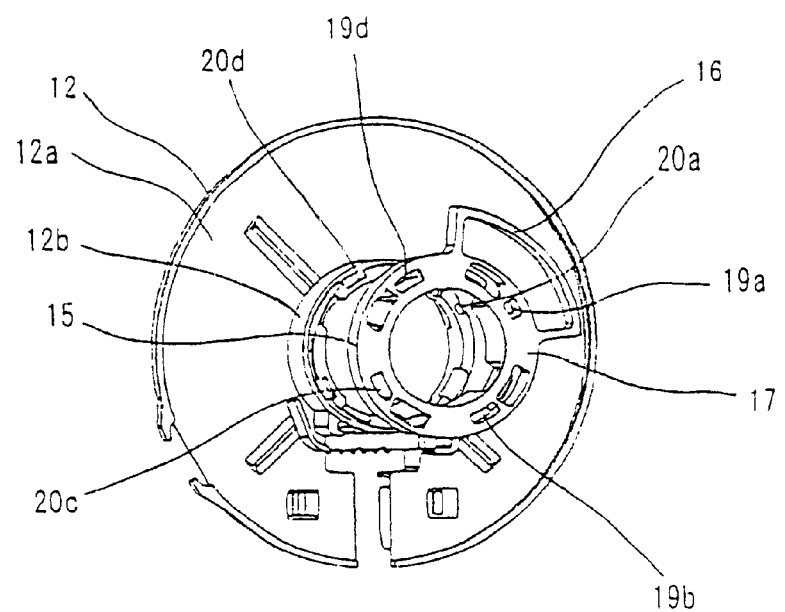
FIG. 2 is a perspective view of the locking collar inserted into the rotor, according to the embodiment of FIGS. 1(A) and (B).

A first embodiment of the present invention is illustrated in FIGS. 1–3. In FIG. 1, a cable reel 10 includes a casing 11 having an annular-shaped bottom wall 11a and an external peripheral wall 11b. The reel 10 also includes a rotor 12 having an annular-shaped upper wall 12a connected to central axial hub 12b. Since the casing 11 and rotor 12 are assembled together, both parts rotate in unison as an assembly. A flat electrical cable 14 (depicted schematically) is spirally housed in an annular-shaped hollow area 13 located between the casing 11 and rotor 12. The cable is wound/rewound in the hollow area 13 according to the reciprocal rotation of rotor 12 which corresponds to steering wheel movement.

As shown in FIGS. 1–2, the locking collar 15 includes an annular flange 17 having a cancel cam 16 formed on the outer perimeter of the flange, and an axially centered cylindrical sleeve 18a, which interfits with the central axial hub 12b. As shown in FIGS. 1(A)–1(B), the lower edge (or distal end) 12c of the central axial hub 12b extends downwardly past the bottom wall 11a of casing 11. The outside peripheral surface of the lower edge (or distal end) 12c of hub 12b is attached to locking collar 15.

Connected to the upper surface of flange 17, proximate the outer surface of cylindrical sleeve 18a, an axially centered cylindrical rim 18 having four generally rectangular-shaped securing protrusions 19(19a–19d), positioned at 90° intervals in a peripheral direction. However, securing protrusion 19a is considered a "positioning" protrusion and is a different size than the other three securing protrusions 19b–19d, which are all the same size. For example, "positioning" protrusion 19a can be either smaller or larger in size than the remaining plurality securing protrusions.

As shown from below in FIG. 3(A), the lower edge (or distal end) 12c of the central axial hub 12b is provided with four slot-shaped securing recesses 20(20a–20d) provided at intervals of 90° in a peripheral direction. Furthermore, as shown in FIGS. 3(B) and 3(C), each securing recess is formed in an inverted L-shape, including a vertical groove 20-1 at a lower end opening provided in an axial direction, and a transverse groove 20-2 provided horizontally at 90° continuously from an upper side surface 20-3 of vertical groove 20-1. The "positioning" securing recess 20a is made a different size than the remaining plurality of securing recesses 20b–20d. The size of remaining securing recesses 20b–20d are made equal. A raised projection 20-7, which protrudes in a hook-shape in a normal rotating direction (as shown with an arrow B) is provided on the bottom surface 20-6, of the transverse groove 20-2.

Mounting locking collar 15 onto rotor 12 is accomplished by first locating the "positioning" securing recess 20a in proximity to the "positioning" securing protrusion 19a and interfitting the locking members with each other, which automatically aligns the cancel cam to a desired normal position (i.e. clocked position). The four securing recesses 20a–20d are then interlocked with opening areas 20-4 of the respective vertical grooves 20-1 and securing protrusions 19a–19d, and then are respectively interlocked in a direction from below (as shown by arrow A; see FIG. 3(B)). After inserting the securing protrusion up to the upper side surface 20-3 of vertical grooves 20-1, the securing protrusions are then rotated with the locking collar 15 in a direction (as shown by arrow B; see FIG. 3(C)) along transverse grooves 20-2, and finally each securing protrusion 19a–9d is slid into tip areas 20-5.

On the transverse grooves 20-2, the raised projections 20-7, are rotated in a normal rotation direction (as shown by arrow B). This feature ensures that securing protrusions 19, which are inserted into the tip areas 20-5, do not easily come out during reverse rotation (as shown by arrow C). Thus, inadvertent unlocking is prevented even when a reverse rotation is made.

With such a mounting structure, since "positioning" securing protrusion 19a is smaller (or larger) in size and interlocked with the respective smaller-sized (or larger-sized) positioning securing recess 20a, the locking collar and rotor are not allowed to interlock with each other at any positions other than the desired normal position. This feature positively assures prevention of an erroneous connection. In addition, by putting a smaller-sized (or larger-sized) positioning secure area 19a and smaller-sized (or larger-sized) positioning securing recess 20a together, the desired normal position (i.e. clocked position), can easily be identified. This assures accurate mounting at a glance, therefore, resulting in increased assembly line productivity.

Furthermore, since the securing recesses 20a–20d are made in the shape of an inverted L-shape, the locking collar 15 and rotor 12 can be secured not only in a peripheral direction but also in an axial direction; thereby more positively preventing locking collar 15 from inadvertently unlocking by an external force. In addition, one continuous operation that inserts securing protrusion 19 into securing recess 20, followed by rotation (see FIG. 3(B)–(C); see arrow direction B), provides a more positive locking action.

Also, by making the shape of the securing recess an inverted L-shape, the locking collar is secured not only in a peripheral direction but also in an axial direction to the rotor. As a result, an increased resistance to unwanted forces derived from vibrations and shocks that are liable to develop especially in an axial direction, is provided. Furthermore, the mounting procedure is simplified, assuring error free mounting with ease and reducing assembly time.

FIG. 4(B) depicts a second embodiment according to the present invention. The difference being that the cylindrical sleeve 18a (from first embodiment) is not present on the locking collar 15. Rather, only a cylindrical rim 18 is provided with securing protrusions 19a–19d which interlock with securing recesses 20a–20d located on the outer periphery of distal end 12c of hub 12b. Similar to the first embodiment, the sizes of "positioning" securing protrusion 19a and a "positioning" secured recess 20a are made larger (or smaller) than the remaining plurality of securing protrusions and recesses.

Because the larger (or smaller) "positioning" securing protrusion 19a cannot be inserted into any smaller (or larger) securing recesses, other than "positioning" secured recess 20a, an erroneous connection potentially to be made at positions other than the desired normal position, is positively prevented. Furthermore, because merely interlocking the larger positioning securing protrusion 19a with the larger (or smaller) positioning secured recess 20a, the rotor and locking collar are automatically clocked together at the desired normal position and assembly work becomes much easier.

Figure 5:
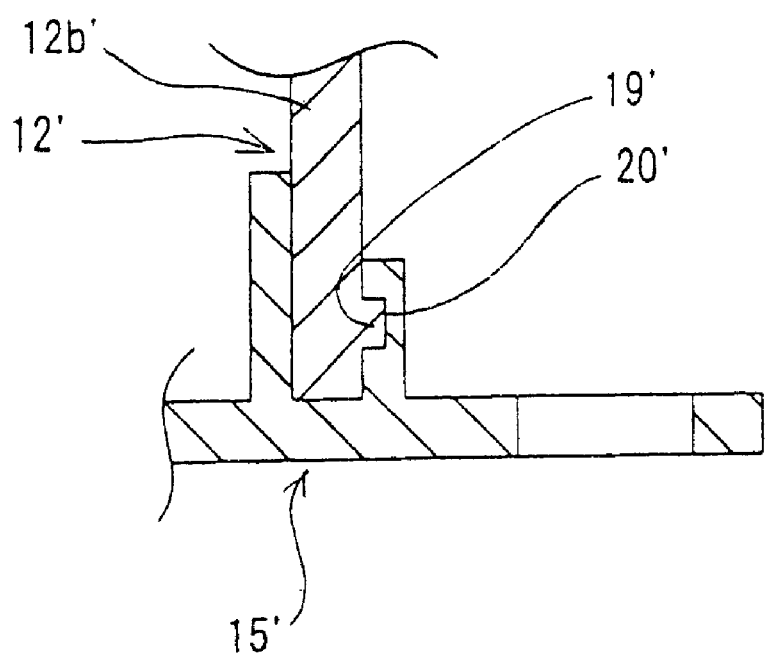
FIG. 5 is an enlarged cross-sectional view of the mounting structure of a third embodiment of the present invention.

FIG. 5 shows a third embodiment according to the present invention. The difference being a securing protrusion 19', having a rectangular shape, is provided on rotor 12'. A securing recess 20', having an inverted L-shape is provided on locking collar 15'. Also, the sizes of "positioning" securing protrusion 19'a and a "positioning" secured recess 20'a are made larger (or smaller) than the remaining plurality of securing protrusions and recesses.

Because the larger (or smaller) "positioning" securing protrusion 19'a cannot be inserted into any smaller (or larger) securing recesses, other than "positioning" secured recess 20'a, an erroneous connection potentially to be made at positions other than the desired normal position, is positively prevented. Furthermore, because merely interlocking the larger positioning securing protrusion 19'a with the larger (or smaller) "positioning" secured recess 20'a, the rotor and locking collar are automatically clocked together at the desired normal position and assembly work becomes much easier.

Changes may be made, without departing from the scope and spirit of the invention in its aspects. Although the invention has been described herein with reference to particular hardware and embodiments, the invention is not intended to be limited to the particulars disclosed herein;

rather, the invention extends to all functionally equivalent structures, methods and uses, such as are within the scope of the appended claims.

For example, the shapes, sizes, spacing, and number of securing protrusions and recesses are not limited to the embodiments described in this specification. Rather any conventional male/female connecting members may be used, as long as one of a plurality of pair of connecting members, is made a different size. Also, the number of pairs of connecting members used is not limited to four pairs spaced at 90°. Rather, a variety of configurations are possible according to the size/shape of the desired embodiment.

The present application relates to subject matter contained in Japanese No. JP 11-187500, filed Jul. 1, 1999, which is expressly incorporated herein by reference.

What I claim is:

1. A mounting structure for fixing a locking collar to a cable reel rotor, said locking collar including a cancel cam, said mounting structure comprising:

a plurality of pairs of securing protrusions and inverted L-shaped securing recesses arranged at a predetermined spaced distance in a peripheral direction on an external peripheral surface on a cylindrically-shaped central axis area of said rotor and on a cylindrical inner peripheral surface of said locking collar, the securing protrusions being arranged on one of said rotor or said locking collar, and the inverted L-shaped securing recesses being arranged on the other of said rotor or said locking collar, wherein the collar is mounted by rotation onto the rotor after inserting the collar onto a lower side of said external peripheral surface;

whereby, one pair among the plurality of pairs of securing recesses and securing protrusions are formed as a specific positioning securing recess and specific securing protrusion having circumferential sizes configured to be different from the circumferential sizes of the remaining pairs of securing recesses and securing protrusions, thereby allowing connection at a normal position of said rotor and said locking collar by preventing other securing protrusions from insertion into said positioning securing recess.

2. A mounting system for fitting a locking collar to a cable reel rotor, said locking collar having an annular flange with an upper and lower side, an axially centered cylindrical rim connected to the upper side of the flange, said cable reel rotor having an axial centered cylindrical hub with a distal end to which said locking collar is attached, said mounting system comprising:

a plurality of securing recesses positioned on one of the outer perimeter of said distal end of said hub and on the inner perimeter of said cylindrical rim, one of said plurality of securing recesses having a different circumferential size than the remaining plurality of securing recesses;

a plurality of securing protrusions provided on the other of the inner perimeter of said cylindrical rim and said outer perimeter distal end of said hub, one of said plurality of securing protrusions having a different circumferential size than the remaining plurality of securing protrusions;

wherein said plurality of securing recesses and protrusions are configured to interlock, thereby fixing said collar to rotor; and wherein said different circumferentially sized securing recess and securing protrusion are configured to interlock only with each other respectively, and when interlocked, simultaneously provide a failure proof radial alignment of a cancel cam to a desired normal position, and allowing the remainder of said plurality of securing recesses and protrusions to be interlocked together, thereby fixing said collar to rotor and positively eliminating an erroneous cancel cam alignment.

3. The mounting system of claim 2, wherein said one of said plurality of securing recesses and one of said plurality of securing protrusions are circumferentially smaller than the remaining plurality of securing recesses and securing protrusions.

4. The mounting system of claim 2, wherein said one of said plurality of securing recesses and one of said plurality of securing protrusions are circumferentially larger than the remaining plurality of securing recesses and securing protrusions.

5. The mounting system of claim 2, wherein said plurality of securing recesses are provided on said outer perimeter of said distal end of said hub, and said plurality of securing protrusions are provided on the inner perimeter said cylindrical rim.

6. The mounting system of claim 5, wherein said plurality of recesses each comprise an inverted L-shaped recess with a short leg of the L-shape oriented in an axial direction of said hub, and a long leg of the L-shape oriented in a peripheral direction of said hub, so that said securing protrusions are axially inserted into said short leg of L-shaped recess, after which said locking collar and said hub are relatively rotated to position said securing protrusions in said long leg of said L-shaped recess to prevent disengagement of said locking collar in an axial direction.

7. The mounting system of claim 6, wherein said long leg of at least one L-shaped recess includes a hooking projection to engage a respective one of said securing protrusions to prevent disengagement of said locking collar in a peripheral direction.

8. The mounting system of claim 7, further comprising an inner axially centered cylindrical sleeve provided on the upper side of said annular flange and positioned proximate an inner side of said cylindrical rim, so that the distal end of said hub is engaged between said cylindrical rim and said cylindrical sleeve.

9. The mounting system of claim 2, wherein said plurality of securing recesses are provided on the inner perimeter of said cylindrical rim, and said plurality of securing protrusions are provided on said outer perimeter of said distal end of said hub.

10. The mounting system of claim 9, wherein said plurality of recesses each comprise an inverted L-shaped recess with a short leg of the L-shape oriented in an axial direction of said hub, and a long leg of the L-shape oriented in a peripheral direction of said hub, so that said securing protrusions are axially inserted into said short leg of L-shaped recess, after which said locking collar and said hub are relatively rotated to position said securing protrusions in said long leg of said L-shaped recess to prevent disengagement of said locking collar in an axial direction.

11. The mounting system of claim 10, wherein said long leg of at least one L-shaped recess includes a hooking projection to engage a respective one of said securing protrusions to prevent disengagement of said locking collar in a peripheral direction.

12. The mounting system of claim 11, further comprising an inner axially centered cylindrical sleeve provided on the upper side of said annular flange and positioned proximate an inner side of said cylindrical rim, so that the distal end of said hub is engaged between said cylindrical rim and said cylindrical sleeve.

13. An apparatus for a steering system of a vehicle, said apparatus comprising:
- a rotor having an annular-shaped wall connected to a central axial hub, said hub having a distal connecting end opposite said wall;
- a locking collar having an annular flange with an upper and lower side and a cancel cam formed on the outer perimeter of said flange, wherein said flange is connected to an axially centered cylindrical rim;
- a mounting system for fitting said cylindrical rim to said distal connecting end of said hub, said mounting system comprising,
- a plurality of securing recesses positioned on the other of said outer perimeter of said distal connecting end of said hub and on the inner perimeter said cylindrical rim, one of said plurality of securing recesses having a different circumferential size than the remaining plurality of securing recesses;
- a plurality of securing protrusions provided on one of the inner perimeter of said cylindrical rim and said outer perimeter of said hub, one of said plurality of securing protrusions having a different circumferential size than the remaining plurality of securing protrusions;
- wherein said plurality of securing recesses and protrusions are configured to interlock, thereby fixing said collar to rotor; and
- wherein said different circumferentially sized securing recess and securing protrusion are configured to interlock only with each other respectively, and when interlocked, simultaneously provide a failure proof radial alignment of said cancel cam to a desired normal position, and allowing the remainder of said plurality of securing recesses and protrusions to be interlocked together, thereby fixing said collar to rotor, and positively eliminating an erroneous cancel cam alignment.

14. The apparatus for a steering system of claim 13, wherein said one of said plurality of securing recesses and one of said plurality of securing protrusions are circumferentially smaller than the remaining plurality of securing recesses and securing protrusions.

15. The apparatus for a steering system of claim 13, wherein said one of said plurality of securing recesses and one of said plurality of securing protrusions are circumferentially larger than the remaining plurality of securing recesses and securing protrusions.

16. The apparatus for a steering system of claim 13, wherein said plurality of securing recesses are provided on said outer perimeter of said distal end of said hub, and said plurality of securing protrusions are provided on the inner perimeter of said cylindrical rim.

17. The apparatus for a steering system of claim 16, wherein said plurality of recesses each comprise an inverted L-shaped recess with a short leg of the L-shape oriented in an axial direction of said hub, and a long leg of the L-shape oriented in a peripheral direction of said hub, so that said securing protrusions are axially inserted into said short leg of L-shaped, after which said locking collar and said hub are relatively rotated to position said securing protrusions in said long leg of said L-shaped recess to prevent disengagement of said locking collar in an axial direction.

18. The apparatus for a steering system of claim 17, wherein said long leg of at least one L-shaped recess includes a hooking projection to engage a respective one of said securing protrusions to prevent disengagement of said locking collar in a peripheral direction.

19. The apparatus for a steering system of claim 18, further comprising an inner axially centered cylindrical sleeve provided on the upper side of said annular flange and positioned proximate an inner side of said cylindrical rim, so that the distal end of said hub is engaged between said cylindrical rim and said cylindrical sleeve.

20. The apparatus for a steering system of claim 13, wherein said plurality of securing recesses are provided on the inner perimeter of said cylindrical rim, and said plurality of securing protrusions are provided on said outer perimeter of said distal end of said hub.

21. The apparatus for a steering system of claim 20, wherein said plurality of recesses each comprise an inverted L-shaped recess with a short leg of the L-shape oriented in an axial direction of said hub, and a long leg of the L-shape oriented in a peripheral direction of said hub, so that said securing protrusions are axially inserted into said short leg of L-shaped recess, after which said locking collar and said hub are relatively rotated to position said securing protrusions in said long leg of said L-shaped recess to prevent disengagement of said locking collar in an axial direction.

22. The apparatus for a steering system of claim 21, wherein said long leg of at least one L-shaped recess includes a hooking projection to engage a respective one of said securing protrusions to prevent disengagement of said locking collar in a peripheral direction.

23. The apparatus for a steering system of claim 22, further comprising an inner axially centered cylindrical sleeve provided on the upper side of said annular flange and positioned proximate an inner side of said cylindrical rim, so that the distal end of said hub is engaged between said cylindrical rim and said cylindrical sleeve.

* * * * *